(12) United States Patent
Kasada et al.

(10) Patent No.: US 9,779,772 B1
(45) Date of Patent: Oct. 3, 2017

(54) MAGNETIC TAPE AND MAGNETIC TAPE DEVICE

(71) Applicant: FUJIFILM Corporation, Tokyo (JP)

(72) Inventors: Norihito Kasada, Minami-ashigara (JP); Tetsuya Kaneko, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/464,991

(22) Filed: Mar. 21, 2017

(30) Foreign Application Priority Data

Mar. 22, 2016 (JP) ................................ 2016-056850

(51) Int. Cl.
*G11B 5/78* (2006.01)
*G11B 5/712* (2006.01)
*G11B 5/592* (2006.01)

(52) U.S. Cl.
CPC ............ *G11B 5/712* (2013.01); *G11B 5/5926* (2013.01); *G11B 5/78* (2013.01)

(58) Field of Classification Search
CPC .......... G11B 5/712; G11B 5/5926; G11B 5/78

USPC ......................................................... 360/134
See application file for complete search history.

(56) References Cited

U.S. PATENT DOCUMENTS

| 4,693,930 A * | 9/1987 | Kuo ......................... G11B 5/71 427/128 |
| 5,689,384 A | 11/1997 | Albrecht et al. |
| 7,511,907 B2 * | 3/2009 | Dugas .................... G11B 5/584 360/121 |

FOREIGN PATENT DOCUMENTS

| DE | 10146429 A1 * | 3/2002 | ............... G11B 5/70 |
| JP | 11175949 A * | 7/1999 | ............... G11B 5/70 |

* cited by examiner

*Primary Examiner* — Allen T Cao
(74) *Attorney, Agent, or Firm* — Sughrue Mion, PLLC

(57) ABSTRACT

The magnetic tape has a magnetic layer containing ferromagnetic powder and binder on a nonmagnetic support, wherein a timing based servo pattern is present on the magnetic layer, the centerline average surface roughness Ra that is measured on the surface of the magnetic layer is less than or equal to 1.8 nm, and the coefficient of friction that is measured on the base portion of the surface of the magnetic layer is less than or equal to 0.35.

14 Claims, 1 Drawing Sheet

MAGNETIC TAPE AND MAGNETIC TAPE DEVICE

CROSS-REFERENCE TO RELATED APPLICATIONS

This application claims priority under 35 U.S.C 119 to Japanese Patent Application No. 2016-056850 filed on Mar. 22, 2016. The above application is hereby expressly incorporated by reference, in its entirety.

BACKGROUND OF THE INVENTION

Field of the Invention

The present invention relates to a magnetic tape and a magnetic tape device.

Discussion of the Background

Magnetic recording media include tape-shaped media and disk-shaped media. Magnetic recording media in the form of tapes—that is, magnetic tapes—are primarily employed in data storage applications such as data backup and archives. Information is typically recorded on a magnetic tape by recording a magnetic signal on the data band of the magnetic tape. Thus, data tracks are formed on the data band.

In recent years, the steep rise in the overall quantity of information in existence has been accompanied by increased demand for magnetic tapes capable of higher recording capacity. One method of achieving higher capacity is to reduce the width of the data track so that more data tracks can fit in the widthwise direction of the magnetic tape, which increases the recording density.

However, when the data track width is reduced, in the process of running a magnetic tape within a magnetic tape device (commonly called a "drive") for recording and/or reproducing a magnetic signal, variation in the position of the magnetic tape in the widthwise direction makes it difficult for the magnetic head to accurately follow the data track. This tends to cause more errors to occur during recording and/or reproduction. Accordingly, one means of reducing the generation of such errors proposed in recent years is to employ head tracking servo that uses servo signals (hereinafter referred to as "servo systems"), and put to practical use (for example, see U.S. Pat. No. 5,689,384, which is expressly incorporated herein by reference in its entirety).

SUMMARY OF THE INVENTION

Among servo systems, in a magnetic servo-type servo system, a servo signal (servo pattern) is formed on the magnetic layer of a magnetic tape, and the servo pattern is magnetically read to conduct head tracking. This will be described in greater detail below.

First, a servo head reads the servo signal that has formed on the magnetic layer. The position of the magnetic head in the widthwise direction of the magnetic tape is controlled based on the servo signal that has been read. Consequently, when running a magnetic tape within a magnetic tape device to record and/or reproduce a magnetic signal (information), it is possible to increase the precision with which the magnetic head follows the data tracks, even when the position of the magnetic tape fluctuates in the widthwise direction relative to the magnetic head. In this manner, it is possible to accurately record information on the magnetic tape, and/or accurately reproduce information that has been recorded on the magnetic tape.

The timing based servo system has been widely employed in recent years as the servo system of the magnetic servo system set forth above. In the servo system of a timing based servo system (hereinafter referred to as a "timing based servo system"), multiple servo patterns of two or more differing forms are formed on the magnetic layer and the position of the servo head is determined based on the time interval at which the servo head reproduces (reads) two servo patterns of different form, as well as the time interval at which two servo patterns of identical shape are reproduced. The position of the magnetic head in the widthwise direction of the magnetic tape is controlled based on the position of the servo head that is determined in this manner.

In recent years, increased magnetic layer surface smoothness has been demanded of magnetic tapes. This is because increasing the surface smoothness of the magnetic layer can be linked to enhancing electromagnetic characteristics. However, in repeated research conducted by the present inventors, a previously unknown phenomenon has become clear, whereby the precision with which the magnetic head follows the data track (hereinafter referred to as the "head positioning precision") in a timing based servo ends up decreasing as the surface smoothness of the magnetic layer of a magnetic tape is increased.

An aspect of the present invention provides for achieving both increased surface smoothness of the magnetic layer in a magnetic tape and enhanced head positioning precision in a timing based servo system.

An aspect of the present invention relates to a magnetic tape having a magnetic layer containing ferromagnetic powder and binder on a nonmagnetic support, wherein a timing based servo pattern is present on the magnetic layer;

the centerline average surface roughness Ra that is measured on the surface of the magnetic layer is less than or equal to 1.8 nm; and the coefficient of friction that is measured on the base portion of the surface of the magnetic layer is less than or equal to 0.35.

In the present invention and present specification, the "timing based servo pattern" refers to a servo pattern permitting head tracking in a timing based servo system. Timing based servo systems are as set forth above. A servo pattern permitting head tracking in a timing based servo system is formed as multiple servo patterns of two or more different shapes on the magnetic layer by a servo pattern recording head (called a "servo write head"). In one example, multiple servo patterns of two or more different shapes are continuously disposed at fixed intervals as multiple servo patterns of identical shape. In another example, different types of servo patterns are disposed in alternating fashion. Servo patterns being of identical shape do not mean that they are of completely identical shape; some error in shape produced by the device, such as a servo write head, is permissible. The shape of a servo pattern that permits head tracking in a timing based servo system and the disposition on the magnetic layer are known. Specific forms will be described further below. A timing based servo pattern will also be referred to simply as a "servo pattern" hereinafter. Heads in the form of "servo write heads," "servo heads," and "magnetic heads" will be referred to in the present specification. A servo write head refers to a head that records a servo signal (that is, forms a servo pattern) as set forth above. A servo head refers to a head that reproduces a servo signal (that is, reads a servo pattern). And a magnetic head, unless specifically stated otherwise, refers to a head that records and/or reproduces information.

In the present invention and present specification, the centerline average surface roughness Ra (hereinafter referred to as the "magnetic layer surface Ra") that is measured on the surface of the magnetic layer of a magnetic tape is a value that is measured for an area of 40 μm×40 μm by an atomic force microscope (AFM). The following measurement conditions are an example of measurement conditions. The centerline average surface roughness Ra indicated in Examples set forth further below are values obtained by measurement under the following conditions. In the present invention and present specification, the "surface of the magnetic layer" of a magnetic tape is synonymous with the surface of the magnetic tape on the magnetic layer side.

An area of 40 μm×40 μm on the surface of the magnetic layer of a magnetic tape is measured by AFM (Nanoscope 4 made by Veeco Corp.). The scan rate (probe displacement rate) is 40 μm/s and the resolution is 512 pixels×512 pixels.

The "base portion" as referred to in the present invention is the portion of the surface of the magnetic layer specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 μm length in the longitudinal direction of a magnetic tape), a spherical indenter made of diamond that is 1 μm in radius is passed back and forth once at a load of 100 μN and at a speed of 1 μm/sec. to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The it value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction μ value is conducted for three portions of the base portion randomly determined on the surface of the magnetic layer and the arithmetic average of the three measured values obtained is adopted as the coefficient of friction measured on the base portion. The coefficient of friction measured on the base portion will also be referred to as the "base portion friction" below.

In one embodiment, the base portion friction falls within a range of 0.15 to 0.35.

In one embodiment, the base portion friction falls within a range of 0.15 to 0.30.

In one embodiment, the centerline average surface roughness Ra falls within a range of 1.2 nm to 1.8 nm.

In one embodiment, the centerline average surface roughness Ra falls within a range of 1.2 nm to 1.6 nm.

In one embodiment, a nonmagnetic layer containing nonmagnetic powder and binder is present between the nonmagnetic support and the magnetic layer.

A further aspect of the present invention relates to a magnetic tape device containing the above magnetic tape, a magnetic head, and a servo head.

An aspect of the present invention can provide a magnetic tape having a timing based servo pattern on a magnetic layer of high surface smoothness, wherein the head positioning precision in the timing based servo system is enhanced, as well as a magnetic tape device that records and/or reproduces magnetic signals on this magnetic tape.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
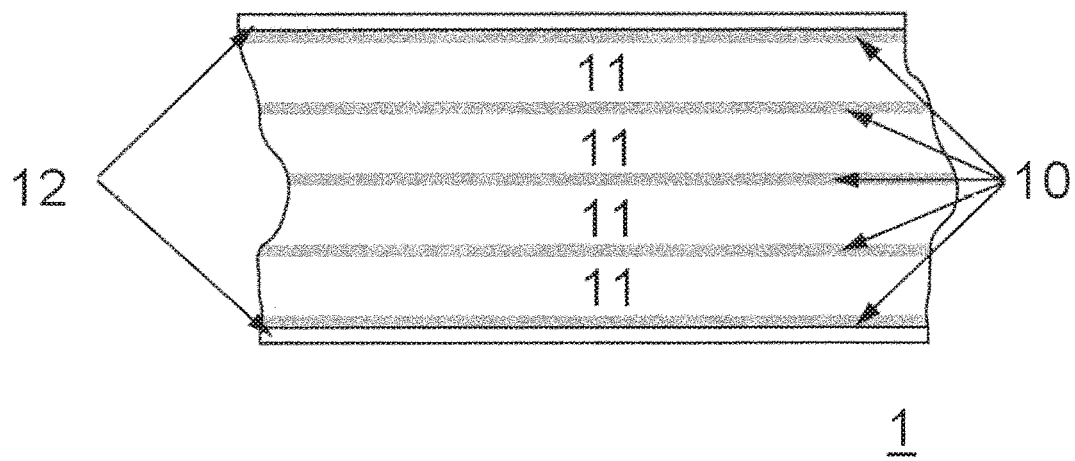
FIG. 1 shows an example of the configuration of the data band and servo band.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Tape

An aspect of the present invention relates to a magnetic tape having a magnetic layer containing ferromagnetic powder and binder on a nonmagnetic support, wherein a timing based servo pattern is present on the magnetic layer; the centerline average surface roughness Ra that is measured on the surface of the magnetic layer is less than or equal to 1.8 nm; and the coefficient of friction that is measured on the base portion of the surface of the magnetic layer is less than or equal to 0.35.

The above magnetic tape will be described in greater detail. The description given below contains presumptions made by the present inventors. The present invention is not limited by such presumptions. Illustrative descriptions based on drawings are provided below. However, the present invention is not limited to these embodiments, which are given by way of example.

<Timing Based Servo Patterns>

A timing based servo pattern is present on the magnetic layer in the above magnetic tape. The term "timing based servo pattern" means the servo pattern described above. For example, in a magnetic tape in which a linear recording system is applied, which is a widely employed recording system in magnetic tape devices, multiple regions in which servo patterns are formed (referred to as "servo bands") are present in the longitudinal direction of the magnetic tape. A region that is sandwiched between two servo bands is called a data band. Information (a magnetic signal) is recorded on the data band. Multiple data tracks are formed in the longitudinal direction within each data band.

Figure 2:
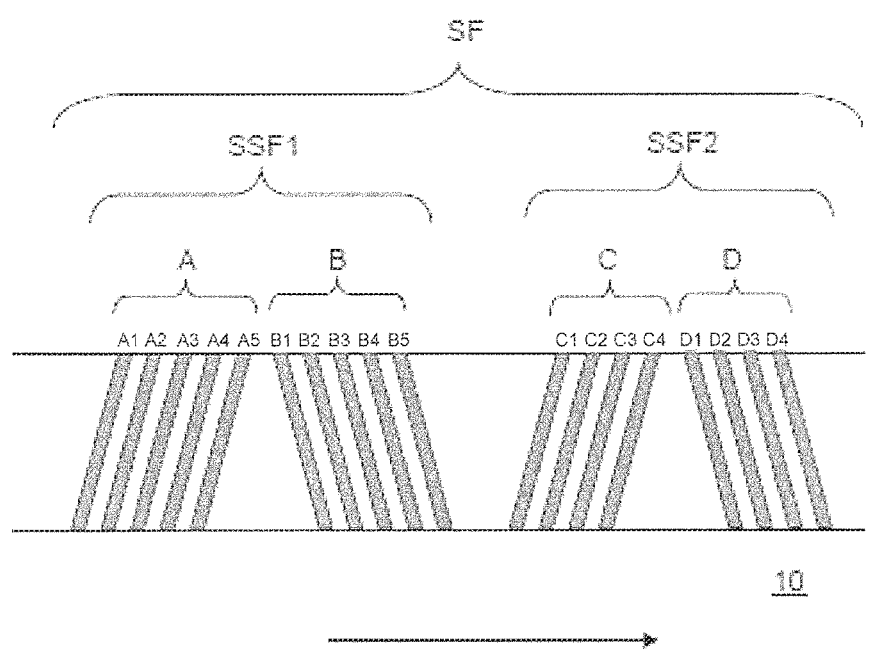
FIG. 2 shows an example of the servo pattern configuration of a tape of LTO (Linear-Tape-Open) Ultrium format.

FIG. 1 shows an example of the disposition of data bands and servo bands. In FIG. 1, multiple servo bands 10 are disposed sandwiched between guide bands 12 on the magnetic layer of a magnetic tape 1. The multiple regions 11 sandwiched between two servo bands are data bands. A servo pattern is a magnetized region, which is formed by a servo write head, which magnetizes the specific region of the magnetic layer. The regions that are magnetized by the servo write head (positions where the servo pattern is formed) are regularly established. For example, during manufacturing of the magnetic tape in an LTO Ultrium format tape, which is an industry standard, multiple servo patterns that are situated on an incline relative to the widthwise direction of the tape (as shown in FIG. 2) are formed on the servo band. Specifically, the servo frame SF on data band 10 in FIG. 2 is comprised of servo sub-frame 1 (SSF1) and servo sub-frame 2 (SSF2). Servo sub-frame 1 is comprised of burst A (symbol A in FIG. 2) and burst B (symbol B in FIG. 2). Burst A is comprised of servo patterns A1 to A5, and burst B is comprised of servo patterns B1 to B5. Additionally, servo sub-frame 2 is comprised of burst C (symbol C in FIG. 2) and burst D (symbol D in FIG. 2). Burst C is comprised of servo patterns C1 to C4 and burst D is comprised of servo patterns D1 to D4. Eighteen of such servo patterns are disposed in sets of 5 and 4 in a 5, 5, 4, 4 arrangement that is disposed in sub-frames, and used to identify the servo frame. One servo frame is shown in FIG. 2. However, multiple servo frames are disposed in the running direction in each data band. The arrow denotes the running direction in FIG. 2.

In a timing based servo system, the position of the servo head is identified by means of time intervals where two servo patterns of different shape are reproduced (read) by a servo head and time intervals where two servo patterns of identical shape are reproduced. The time intervals are normally calculated as time intervals between peaks in the reproduced waveforms of the servo signal. For example, in the embodiment shown in FIG. 2, the servo pattern of burst A and the servo pattern of burst C are servo patterns of identical shape. The servo pattern of burst B and the servo pattern of burst D are servo patterns of identical shape. The servo pattern of burst A and the servo pattern of burst C is a servo pattern with a different shape from the servo pattern of burst B and the servo pattern of burst D. The time interval at which servo patterns of different shape are reproduced by the servo head is, for example, the interval between the time when any servo pattern of burst A is reproduced and the time when any servo pattern of burst B is reproduced. The time interval between when two servo patterns of identical shape are reproduced by the servo head refers, for example, to the interval between the time when any servo pattern of burst A is reproduced and the time when any servo pattern of burst C is reproduced.

A timing based servo system is a system in which, when the time interval slips from the setting value, the slip in the time interval is assumed to be caused by a change in the position of the magnetic tape in the direction of width. The term "setting value" is the time interval when a magnetic tape runs without positional displacement in the direction of width. In a timing based servo system, the magnetic head is displaced in the direction of width based on the degree of the slip from the setting value of the time interval that is obtained. Specifically, the greater the slip from the setting value of the time interval, the greater the displacement of the magnetic head in the direction of width. This is not limited to the embodiments shown in FIGS. 1 and 2. It applies to timing based servo systems in general.

The present inventors presume the following about the above magnetic tape as regards the above.

The reason a drop in head positioning precision occurs in timing based servo systems for magnetic tapes with highly smooth magnetic layer surfaces is thought to be that the factors behind a slip from the setting value of the time interval include factors other than positional displacement in the direction of width of the magnetic tape (referred to as "other factors" hereinafter). It is presumed that since a timing based servo system also identifies slips imparted by other factors as slips imparted by positional displacement in the direction of width of the magnetic tape, it ends up displacing the magnetic head by more than the distance required for it to track the positional displacement in the direction of width of the magnetic tape. This is presumed to be a reason of a drop in head positioning precision in a timing based servo system.

The present inventors conducted extensive research in the presumption that variation in the running speed of the servo head was one of these other factors (that is, a factor behind the slip from the setting value of the above time interval). As a result, they discovered that it was possible to improve head positioning precision in a timing based servo system for a magnetic tape with a magnetic layer surface Ra of less than or equal to 1.8 nm by keeping the base portion friction to less than or equal to 0.35. This will be described in greater detail.

In a magnetic tape with a magnetic layer surface Ra of less than or equal to 1.8 nm, the probability of the servo head contacting the base portion during running is thought to be higher than in a magnetic tape with a rougher magnetic layer surface. Accordingly, in a magnetic tape with a magnetic layer surface Ra of less than or equal to 1.8 nm, the effect of the base portion friction on change in the running speed of the servo head is presumed by the present inventors to be greater than that in a magnetic tape in which the magnetic layer surface Ra exceeds 1.8 nm. The higher the value of the base portion friction, the greater the drop in the sliding property of the servo head when it contacts the base portion, which is thought to produce fluctuation in the running speed. By contrast, the present inventors presume that keeping the base portion friction to less than or equal to 0.35 can contribute to enhancing the sliding property in the course of contact between the base portion and a servo head that is running over a magnetic tape with a magnetic layer surface Ra of less than or equal to 1.8 nm, inhibiting variation in the running speed of the servo head. Thus, the present inventors presume that reducing the effects of other factors on slipping from the setting value of the above time interval can improve the head positioning precision in a timing based servo system for a magnetic tape having a magnetic layer surface Ra of less than or equal to 1.8 nm.

However, the above is merely a presumption by the present inventors and does not limit the present invention in any way.

The above magnetic tape will be described in greater detail below.

<Magnetic Layer Surface Ra>

The centerline average surface roughness Ra (magnetic layer surface Ra) that is measured on the surface of the magnetic layer of the above magnetic tape is less than or equal to 1.8 nm. In a magnetic tape in which the magnetic layer surface Ra is less than or equal to 1.8 nm, if no countermeasures are adopted, a phenomenon whereby the head positioning precision decreases in a timing based servo system will end up occurring. By contrast, in the above magnetic tape having a base portion friction of less than or equal to 0.35, despite a magnetic layer surface Ra of less than or equal to 1.8 nm, it is possible to inhibit the drop in head positioning precision in a timing based servo system. Presumptions by the present inventors in this regard are as set forth above. The above magnetic tape with a magnetic layer surface Ra of less than or equal to 1.8 nm can exhibit good electromagnetic characteristics. From the perspective of further enhancing electromagnetic characteristics, the magnetic layer surface Ra is desirably less than or equal to 1.7 nm, preferably less than or equal to 1.6 nm, and more preferably, less than or equal to 1.5 nm. The magnetic layer surface Ra can be greater than or equal to 1.2 nm, for example, However, from the perspective of enhancing the electromagnetic characteristics, the lower the magnetic layer surface Ra is, the better. Thus, values falling below this value, given by way of example, are possible.

The magnetic layer surface Ra can be controlled by known methods. For example, since the magnetic layer surface Ra can be changed based on the size of the various powders contained in the magnetic layer (for example, ferromagnetic powder and optionally incorporated nonmagnetic powder), the manufacturing conditions of the magnetic tape, and the like, these can be adjusted to obtain a magnetic tape with a magnetic layer surface Ra of less than or equal to 1.8 nm.

<Base Portion Friction>

The coefficient of friction (base portion friction) that is measured on the base portion of the magnetic layer surface of the above magnetic tape is less than or equal to 0.35. As set forth above, having a base portion friction of less than or equal to 0.35 is presumed by the present inventors to contribute to enhancing the head positioning precision in a timing based servo system. From the perspective of further enhancing the head positioning precision in a timing based servo system, the base portion friction is desirably less than or equal to 0.33 and preferably less than or equal to 0.30. The base portion friction can be, for example, greater than or equal to 0.10, greater than or equal to 0.15, or greater than or equal to 0.20. However, from the perspective of inhibiting a drop in the head positioning precision in a timing based servo system in a magnetic tape with a magnetic layer surface Ra of less than or equal to 1.8 nm, the lower the base portion friction is, the better. Thus, values falling below this value, given by way of example, are possible.

With respect to measurement of the base portion friction, the reason that the protrusions are defined as protrusions having a height of greater than or equal to 15 nm from the reference surface is that the protrusions that are normally recognized as protrusions present on the surface of the magnetic layer are primarily those having a height of greater than or equal to 15 nm from the reference surface. For example, such protrusions are formed on the surface of the magnetic layer by nonmagnetic powder such as abrasive. By contrast, the present inventors presume that irregularities that are more microscopic than the irregularities that are formed by such protrusions are present on the surface of the magnetic layer. The present inventors also presume that the base portion friction can be adjusted by controlling the shape of these microscopic irregularities. Based on this presumption, the present inventors formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventors presume that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventors formed a magnetic layer using additional nonmagnetic powder with an average particle size greater than that of the ferromagnetic powder together with the nonmagnetic powder, such as abrasive, capable of forming protrusions having a height of greater than or equal to 15 nm from the reference surface on the surface of the magnetic layer to control the shape of irregularities on the base portion. It was thus possible to control the base portion friction to various values. Accordingly, another example of a way of adjusting the base portion friction is to use this additional nonmagnetic powder when forming the magnetic layer. More specifically the present inventors presume that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

The magnetic tape will be described in greater detail below.

\<Magnetic Layer\>
(Ferromagnetic Powder)

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

The specific embodiment of adjusting the base portion friction with the ferromagnetic powder is forming the magnetic layer with the use of two or more kinds of ferromagnetic powder of differing average particle size. In this embodiment, from the perspective of enhancing the recording density of the magnetic tape, it is desirable to employ ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably greater than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)–(average particle size of the former)", desirably falls within a range of 10 nm to 80 nm, preferably falls within a range of 10 nm to 50 nm, more preferably falls within a range of 10 nm to 40 nm, and still more preferably, fails within a range of 12 nm to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

The term "ferromagnetic powders of differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders of differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the first ferromagnetic powder with an average particle size of 10 nm to 50 nm, for example, in the greatest proportion, a maximum peak will normally be found within the particle size range of 10 nm to 50 nm in the particle size distribution curve.

A portion of the above additional ferromagnetic powder can be replaced with nonmagnetic powder, described further below.

The average particle size of the ferromagnetic powder in the present invention and specification is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss. In the present invention and the present specification, the term powder means a collection of multiple particles. For example, ferromagnetic powder means a collection of multiple ferromagnetic particles. The term collection is not limited to forms in which the particles are in direct contact, but includes forms in which binder, an additive, or the like is present between the particles. The term particle is sometimes used to denote powder.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (for example, average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (for example, average major axis length), from the perspective of achieving higher density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both, and can contain one or more other kinds of ferromagnetic powder.

The content (fill rate) of ferromagnetic powder in the magnetic layer desirably falls within a range of 50 to 90 weight percent, preferably within a range of 60 to 90 weight percent. The components of the magnetic layer other than the ferromagnetic powder include at least binder, and can include one or more additives. A high fill rate is desirable from the perspective of raising the recording density.

(Binder, Curing Agent)

The above magnetic tape is a particulate magnetic tape that contains binder along with ferromagnetic powder in the magnetic layer. The various resins that are commonly employed as binders in particulate magnetic recording media can be employed as binders. For example, polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer and the backcoat layer described further below. Reference can be made to paragraphs 0028 to 0031 of Japanese Unexamined Patent Publication (KOKAI) No. 2010-24113, which is expressly incorporated herein by reference in its entirety, with regard to the above binders. The average molecular weight of the resin that is employed as binder, given as a weight average molecular weight, is by way of example greater than or equal to 10,000 and less than or equal to 200,000. In the present invention and specification, the term "weight average molecular weight" is a value measured by gel permeation chromatography (GPC) and converted to a polystyrene equivalent. An example of measurement conditions is given below. The weight average molecular weights given in Examples below are values measured under the following conditions and converted to polystyrene equivalents.

GPC device: HLC-8120 (made by Tosoh)
Column: TSK gel Multipore HXL-M (7.8 mm ID (inner diameter)×30.0 cm, made by Tosoh)
Eluent: Tetrahydrofuran (THF)

A curing agent can be employed with the above resin suitable for use as the binder. In one embodiment, the curing agent is a thermosetting compound in the form of a compound undergoing a curing reaction (crosslinking reaction) when heated. In another embodiment, it is a light-curable compound undergoing a curing reaction (crosslinking reaction) when irradiated with light. A thermosetting compound is desirable as curing agent, and polyisocyanate is suitable. For details relating to polyisocyanate, reference can be made to Japanese Unexamined Patent Publication (KOKAI) No. 2011-216149, paragraphs 0124 and 0125. The content of curing agent in the magnetic layer-forming composition is, for example, 0 to 80.0 weight parts, and from the perspective of enhancing the coating strength, desirably falls within a range of 50.0 to 80.0 weight parts, per 100.0 weight parts of binder.

(Additives)

Ferromagnetic powder and binder are incorporated into the magnetic layer. As needed, one or more additives can also be incorporated. An example of an additive is the above curing agent. The curing agent can be incorporated into the magnetic layer in a state in which at least a portion of the curing agent has been reacted (crosslinked) with another component such as the binder by conducting a curing reaction in the process of forming the magnetic layer. Nonmagnetic powder, lubricants, dispersing agents, dispersion adjuvants, antifungal agents, antistatic agents, oxidation-inhibiting agents, carbon black, and the like are examples of additives that can be incorporated into the magnetic layer. Additives can be employed in the form of commercial products that have been selected based on the properties desired.

It is desirable to incorporate one or more nonmagnetic powders into the magnetic layer. Examples of nonmagnetic powders are nonmagnetic powders that are capable of functioning as protrusion-forming agents that suitably protrude from the surface of the magnetic layer and form protrusions (referred to as "protrusion-forming agents" hereinafter). Protrusion-forming agents are components that can contribute to controlling the friction characteristics of the surface of the magnetic layer of the magnetic tape. It is also possible to incorporate nonmagnetic powder that is capable of functioning as an abrasive (referred to as "abrasive" hereinafter). It is desirable to incorporate at least either a protrusion-forming agent or an abrasive, preferably both, into the magnetic layer of the above magnetic tape.

The various nonmagnetic powders that are commonly employed as protrusion-forming agents can be employed as the protrusion-forming agent. The protrusion-forming agent can be an inorganic or organic substance. In one embodiment, from the perspective of achieving a uniform friction characteristic, the particle size distribution of the protrusion-forming agent is desirably that of a monodispersion exhibiting a single peak, and not that of a multiple dispersion exhibiting a distribution with multiple peaks. From the perspective of the availability of monodisperse particles, nonmagnetic powder in the form of powder of an inorganic substance is desirable. Examples of powders of inorganic substances are various powders of metal oxides, metal carbonates, metal sulfates, metal nitrides, metal carbides, and metal sulfides. Inorganic oxide powders are desirable. The protrusion-forming agent is preferably a colloidal particle, more preferably an inorganic oxide colloidal particle. From the perspective of the availability of monodisperse particles, the inorganic oxide constituting the inorganic oxide colloidal particles is desirably silicon dioxide (silica). The inorganic oxide colloidal particles are preferably colloidal silica (silica colloid particles). In the present invention and specification, the term "colloidal particles" refers to particles that are capable of dispersing to yield a colloidal dispersion without precipitating, when added in a quantity of 1 g per 100 mL to at least one organic solvent in the form of at least methyl ethyl ketone, cyclohexanone, toluene, or ethyl acetate, or a mixed solvent containing two or more of these solvents in any blending ratio. The average particle size of the colloidal particles is a value that is determined by the method set forth as an average particle diameter measurement method in Japanese Unexamined Patent Publication (KOKAI) No. 2011-048878, paragraph 0015. The content of the above publication is expressly incorporated herein by reference in its entirety. In another embodiment, the protrusion-forming agent is desirably carbon black.

The average particle size of the protrusion-forming agent is, for example, 30 nm to 300 nm, desirably 40 nm to 200 nm.

The abrasive is desirably a nonmagnetic powder with a Mohs hardness of greater than 8, preferably a nonmagnetic powder with a Mohs hardness of greater than or equal to 9. The maximum Mobs hardness is 10 of diamond. Specific examples are alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond powder. Of these, alumina powder such as α-alumina and silicon carbide powder are desirable. The specific surface area can be employed as an indicator of the size of abrasive particles. The specific surface area of abrasive is, for example, greater than or equal to 14 $m^2/g$, desirably greater than or equal to 16 $m^2/g$, and preferably greater than or equal to 18 $m^2/g$. The specific surface area of abrasive is, for example, less than or equal to 40 $m^2/g$. The term "specific surface area" is a value that is obtained by measuring primary particles by the nitrogen adsorption method (also known as the Brunauer-Emmett-Teller (BET) single-point method). The specific surface area obtained by such a method will also be referred to hereinafter as the BET specific surface area.

From the perspective of better utilizing the various functions, the contents of the protrusion-forming agent and the abrasive are as follows. The content of the protrusion-forming agent in the magnetic layer is desirably 1.0 to 4.0 weight parts, preferably 1.5 to 3.5 weight parts, per 100.0 weight parts of ferromagnetic powder. The content of abrasive in the magnetic layer is desirably 1.0 to 20.0 weight parts, preferably 3.0 to 15.0 weight parts, and more preferably, 4.0 to 1.0.0 weight parts, per 100.0 weight parts of ferromagnetic powder.

As an example of additives that can be employed in a magnetic layer containing abrasive, the dispersing agent described in Japanese Unexamined Patent Publication (KOKAI) No. 2013-131285, paragraphs 0012 to 0022, is an example of a dispersing agent that can enhance dispersion of abrasive in the magnetic layer-forming composition. The content of the above publication is expressly incorporated herein by reference in its entirety. Enhancing the dispersion of nonmagnetic powder such as abrasive in the magnetic layer-forming composition is desirable to lower the magnetic layer surface Ra.

As set forth above, additional nonmagnetic powder can be employed in addition to the above-described nonmagnetic powder to control the base portion friction to less than or equal to 0.35. Such nonmagnetic powder desirably has Mohs hardness of less than or equal to 8. Various kinds of nonmagnetic powder that are commonly employed in the nonmagnetic layer can be employed. The details are as set forth further below for the nonmagnetic layer. An example of preferred nonmagnetic powder is colcothar (Bengala). Colcothar has Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)–(average particle size of former)", desirably falls within a range of 10 nm to 80 nm, preferably within a range of 10 nm to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

<Nonmagnetic Layer>

The nonmagnetic layer will be described next. In the above magnetic tape, in one embodiment, the magnetic layer can be present directly on the surface of the nonmagnetic support. In another embodiment, a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Known techniques relating to binders, additives and the like of the nonmagnetic layer can be applied to the nonmagnetic layer. In addition, for example, known techniques relating to magnetic layers can be applied as regards the quantity and type of binder and the quantities and types of additives.

The nonmagnetic layer of the above magnetic tape may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Nonmagnetic Support>

The nonmagnetic support (also referred to simply as a "support", hereinafter) will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of the Nonmagnetic Support, Thickness of Various Layers>

The thickness of the nonmagnetic support is desirably 3.00 μm to 20.00 μm, preferably 3.00 μm to 10.00 μm, more preferably 3.00 μm to 6.00 μm, and still more preferably, 3.00 μm to 4.50 μm.

The thickness of the magnetic layer is desirably optimized based on the saturation magnetization level of the magnetic head employed, the head gap length, the bandwidth of the recording signal, and the like. To achieve high-density recording, the thickness of the magnetic layer is desirable 10 nm to 100 nm, preferably 20 nm to 90 nm. A single magnetic layer will suffice. The magnetic layer can be divided into two or more layers having different magnetic characteristics, and known configurations of multilayer magnetic layers can be applied. The thickness of the magnetic layer when divided into two or more layers is the combined thickness of these layers.

The thickness of the nonmagnetic layer is, for example, greater than or equal to 0.05 μm, desirably greater than or equal to 0.07 μm, and preferably, greater than or equal to 0.10 μm. The thickness of the nonmagnetic layer is desirably less than or equal to 0.80 μm, preferably less than or equal to 0.50 μm.

<Backcoat Layer>

The above magnetic tape can have a backcoat layer on the opposite side of the nonmagnetic support from the side on which the magnetic layer is present. The backcoat layer is a layer that contains nonmagnetic powder and binder. The backcoat layer desirably contains either one of, or both, carbon black and an inorganic powder. A known formula for backcoat layers (for example, the types and contents of binder and various additives) can be applied as the formula of the backcoat layer-forming composition. The thickness of the backcoat layer is desirably less than or equal to 0.90 μm, preferably 0.10 μm to 0.70 μm.

The thickness of the various layers in the magnetic tape and the nonmagnetic support can be determined by known film thickness measuring methods. For example, a cross-section in the direction of thickness of the magnetic tape is exposed by a known technique such as with an ion beam or microtome, and the exposed cross-section is observed with a scanning electron microscope. The thickness determined at one spot in the direction of thickness by observing the cross-section can be adopted, or the thickness at two or more spots that have been randomly exposed—for example, two spots—can be determined and the arithmetic average thereof adopted. The thickness of each of the various layers can also be determined as a design thickness calculated from manufacturing conditions.

<Manufacturing Method>
<<Manufacturing a Magnetic Tape on which a Servo Pattern is Formed>>
(Preparation of Various Layer-Forming Compositions)

The composition for forming the magnetic layer, or an optionally provided nonmagnetic layer or backcoat layer, will normally contain solvent in addition to the various components set forth above. Examples of solvent are the organic solvents that are commonly employed to manufacture particulate magnetic recording media. The process of preparing the various layer-forming compositions normally includes at least a kneading step, dispersing step, and mixing steps provided as needed before and after these steps. Each of these steps can be divided into two or more stages. All of the starting materials, such as ferromagnetic powder, nonmagnetic powder, binder, various additives, and solvent, that are employed in the present invention can be added at the beginning or part way through any of the steps. The individual starting materials can also be divided up and added in two or more steps. In the example of the magnetic layer-forming composition, in one embodiment, a dispersion (magnetic liquid) containing ferromagnetic powder and a dispersion containing abrasive (abrasive liquid) can be separately prepared and then simultaneously or sequentially mixed with other components to prepare a magnetic layer-forming composition. Additionally, reference can be made to Japanese Unexamined Patent Publication (KOKAI) No. 2010-231843, paragraph 0065, with regard to the preparation of various layer-forming compositions. The content of the above publication is expressly incorporated herein by reference in its entirety.

In one embodiment, in controlling the base portion friction as set forth above, two or more ferromagnetic powders of differing average particle size can be employed to manufacture the magnetic tape. That is, the magnetic layer can be formed using ferromagnetic powders in the form of a first ferromagnetic powder and one or more ferromagnetic powders of greater average particle size than the first ferromagnetic powder. The following embodiments (1) to (3) are examples of forms of desirable methods of forming such a magnetic layer. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the method of forming the magnetic layer are as set forth above.

(1) The average particle size of the first ferromagnetic powder can fall within a range of 10 nm to 80 nm.
(2) The difference between the average particle size of the ferromagnetic powder with an average particle size greater than that of the first ferromagnetic powder and the average particle size of the first ferromagnetic powder can fall within a range of 10 nm to 50 nm.
(3) The mixing ratio of the first ferromagnetic powder to the ferromagnetic powder with an average particle size greater than that of the first ferromagnetic powder, by weight, can fall within a range of former:latter=90.0:10.0 to 99.9:0.1.

In another embodiment, the magnetic tape can be manufactured using additional nonmagnetic powder in addition to the abrasive and protrusion-forming agent as nonmagnetic powders in the magnetic layer. That is, the magnetic layer can be formed using additional nonmagnetic powder along with the abrasive and protrusion-forming agent as the nonmagnetic powder. The following embodiments (4) to (6) are examples of a desirable embodiment of the method of forming such a magnetic layer. A combination of two or more of the following embodiments is a preferred embodiment of the above manufacturing method. Other details regarding the method of forming the magnetic layer are as set forth above.

(4) The average particle size of the additional nonmagnetic powder can be greater than the average particle size of the ferromagnetic powder.
(5) The difference between the average particle size of the ferromagnetic powder and the average particle size of the additional nonmagnetic powder can fall within a range of 10 nm to 80 nm.
(6) The mixing ratio of the ferromagnetic powder and the additional nonmagnetic powder, based on weight, can fall within a range of former:latter=90.0:10.0 to 99.9:0.1.

(Coating Step)

The magnetic layer can be formed by directly coating the magnetic layer-forming composition, or by sequentially or simultaneously multilayer coating it with the nonmagnetic layer-forming composition, onto the surface of a nonmagnetic support. The backcoat layer can be formed by coating the backcoat layer-forming composition on the opposite surface of a nonmagnetic support on which the magnetic layer is present (or will subsequently be added). Reference can be made to Japanese Unexamined Patent Publication (KOKAI) No. 2010-231843, paragraph 0066, for details regarding coatings to form the various layers.

(Other Steps)

Reference can be made to Japanese Unexamined Patent Publication (KOKAI) No. 2010-231843, paragraphs 0067 to 0070, with regard to various other steps for manufacturing magnetic tapes. An example of a process that is conducted in another step is surface treatment of the magnetic layer surface. Conducting a surface treatment is desirable to increase the smoothness of the surface of the magnetic layer. One example of a surface treatment of the magnetic layer surface is the polishing treatment employing the polishing means described in Japanese Unexamined Patent Publication (KOKAI) Heisei No. 5-62174, which is expressly incorporated herein by reference in its entirety. Paragraphs 0005 to 0032 and the drawings in their entirety can be referenced in this publication.

<<Forming a Servo Pattern>>

A timing based servo pattern is present on the magnetic layer of the above magnetic tape. FIG. 1 shows an example of the layout of regions (servo bands) in which timing based servo patterns are formed and the regions (data bands) that are sandwiched between two servo bands. FIG. 2 shows an example of the layout of a timing based servo pattern. However, the layout examples shown in the various drawings are examples. It suffices to lay out the servo pattern, servo bands, and data bands in a layout based on the type of magnetic tape device (drive). By way of example, known technique such as the layout examples given in U.S. Pat. No. 5,689,384, FIGS. 4, 5, 6, 9, 17, 20, and the like, can be applied without limitation.

The servo pattern can be formed by magnetizing specific regions of the magnetic layer with a servo write head mounted on a servo writer. The regions that are magnetized by a servo write head (positions on which the servo pattern is formed) have been established in standards. A commercial servo writer or a servo writer of known configuration can be employed as the servo writer. By way of example, known technique such as the technique described in Japanese Unexamined Patent Publication (KOKAI) No. 2011-175687, U.S. Pat. No. 5,689,384, and U.S. Pat. No. 6,542,325, which are expressly incorporated herein by reference in their entirety, can be employed without limitation.

The above-described magnetic tape of an aspect of the present invention has the high surface smoothness of a magnetic layer surface Ra of less than or equal to 1.8 nm and is capable of improving the head positioning precision in a timing based servo system.

Magnetic Tape Device

An aspect of the present invention relates to a magnetic tape device containing the above magnetic tape, a magnetic head, and a servo head.

The details regarding the magnetic tape that is loaded into the above magnetic tape device are as set forth above. A timing based servo pattern is present on such a magnetic tape. Accordingly, in the course of a magnetic head recording a magnetic signal on the data band to form a data track and/or reproducing the signal that has been recorded, it is possible for the magnetic head to follow the data track with high precision by simultaneously having the servo head read the servo pattern and conduct timing based servo type head tracking based on the servo pattern that is being read. The position error signal (PES) that is obtained by the method set forth in Examples further below is an example of an indicator of head positioning precision. The PES is an indicator of the head running while displaced from the position where it should be running even when head tracking is being conducted by a servo system in the course of running a magnetic tape in a magnetic tape device. The higher the value, the greater the displacement and the lower the head positioning precision indicated in the servo system. A magnetic tape according to an aspect of the present invention can achieve, for example, a PES of less than or equal to 9.0 nm (falling within a range of 7.0 nm to 9.0 nm, for example).

A known magnetic head that is capable of recording and/or reproducing magnetic signals on a magnetic tape can be employed as the magnetic head that is mounted on the above magnetic tape device. A single magnetic head can serve as both recording head and reproduction head, or separate magnetic heads can be employed. A known servo head that is capable of reading a timing based servo pattern on the above magnetic tape can be employed as the servo head. At least one, and two or more, servo heads can be contained in the magnetic tape device.

Known technique, including the technique described in U.S. Pat. Nos. 5,689,384, 6,542,325, and 7,876,521, which are expressly incorporated herein by reference in their entirety, can be applied for details regarding head tracking in a timing based servo system.

Commercial magnetic tape devices are commonly equipped with magnetic head(s) and servo head(s) according to standards. Commercial magnetic tape devices are commonly equipped with servo control mechanisms that permit head tracking in timing based servo systems according to standards. A magnetic tape device according to an aspect of the present invention, for example, can be configured by incorporating a magnetic tape according to an aspect of the present invention into a commercial magnetic tape device.

EXAMPLES

The present invention will be described in greater detail below through Examples. However, the present invention is not limited to the embodiments shown in Examples. The "parts" indicated below denotes "weight parts", unless otherwise stated.

Examples of Magnetic Tape Fabrication

Example 1

The formula of each of the layer-forming compositions is set forth below.
(Magnetic Layer-Forming Composition)
(Magnetic Liquid)
  Ferromagnetic hexagonal barium ferrite powder 100.0 parts
    Ferromagnetic hexagonal barium ferrite powder (1) (average particle size (average plate diameter) and formula ratio: See Table 1)
    Ferromagnetic hexagonal barium ferrite powder (2) (average particle size (average plate diameter) and formula ratio: See Table 1)
  Oleic acid: 2.0 parts
  Vinyl chloride copolymer (MR-104 made by Zeon Corp.): 10.0 parts
  $SO_3Na$ group-containing polyurethane resin: 4.0 parts
    (weight average molecular weight: 70,000, $SO_3Na$ groups: 0.07 meq/g)
  Methyl ethyl ketone: 150.0 parts
  Cyclohexanone: 150.0 parts
(Abrasive Liquid)
  α-Alumina (BET specific surface area: 19 $m^2$/g): 6.0 parts
  $SO_3Na$ group-containing polyurethane resin
    (weight average molecular weight: 70,000, $SO_3Na$ groups: 0.1 meq/g): 0.6 part
  2,3-Dihydroxynaphthalene: 0.6 part
  Cyclohexanone: 23.0 parts
(Protrusion-Forming Agent Liquid)
  Colloidal silica (average particle size: 120 nm): 2.0 parts
  Methyl ethyl ketone: 8.0 parts
(Lubricant and Curing Agent Liquid)
  Stearic acid: 3.0 parts
  Amide stearate: 0.3 part
  Butyl stearate: 6.0 parts
  Methyl ethyl ketone: 110.0 parts
  Cyclohexanone: 110.0 parts
  Polyisocyanate (Coronate (Japanese registered trademark) L, made by
    Nippon Polyurethane Industry Co., Ltd.): 3.0 parts
  (Nonmagnetic layer-forming composition)
  Carbon black (average particle size: 16 nm, dibutyl phthalate
    (DBP) absorption capacity: 74 $cm^3$/100 g) 100.0 parts
  Trioctyl amine: 4.0 parts
  Vinyl chloride copolymer (MR-104 made by Zeon Corp.): 19.0 parts
  $SO_3Na$ group-containing polyurethane resin
    (weight average molecular weight: 50,000, $SO_3Na$ groups:
    0.07 meq/g): 12.0 parts
  Methyl ethyl ketone: 370.0 parts
  Cyclohexanone: 370.0 parts
  Stearic acid: 2.0 parts
  Amide stearate: 0.3 part
  Butyl stearate: 2.0 parts (Backcoat Layer-Forming Composition)

Bengala (average particle size: 0.15 μm, average acicular ratio: 7, BET specific surface area: 52 nm$^2$/g): 80.0 parts Carbon black (average particle size: 16 nm, DBP absorption: 74 cm$^3$/100 g): 20.0 parts Phenylphosphonic acid: 3.0 parts Vinyl chloride copolymer (MR-104 made by Zeon Corp.): 12.0 parts SO$_3$Na group-containing polyurethane resin (weight average molecular weight: 50,000, SO$_3$Na groups:

0.07 meq/g): 8.0 parts

α-Alumina (BET specific surface area: 17 m$^2$/g): 5.0 parts

Methyl ethyl ketone: 370.0 parts

Cyclohexanone: 370.0 parts

Stearic acid: 1.0 part

Amide stearate: 0.3 part

Butyl stearate: 2.0 parts

Polyisocyanate (Coronate L made by Nippon Polyurethane Industry

Co., Ltd.): 5.0 parts (Preparation of Magnetic Layer-Forming Composition)

A magnetic layer-forming composition was prepared by the following method.

The above magnetic liquid was kneaded and dilution processed in an open kneader. A horizontal bead mill disperser was then used to conduct 30 passes of dispersion processing, each pass consisting of a two-minute residence time, at a rotor tip peripheral speed of 10 m/s using zirconia (ZrO$_2$) beads (referred to as "Zr beads" hereinafter) 0.1 mm in bead diameter at a bead fill rate of 80 volume %.

For the abrasive liquid, the above components were mixed, charged to a horizontal bead mill disperser together with Zr beads 0.3 mm in bead diameter, adjusted to a bead volume/(abrasive liquid volume+bead volume) of 80%, and bead mill dispersion processed for 120 minutes. The liquid was removed following processing and then processed by ultrasonic dispersion filtration with a flow-type ultrasonic dispersion and filtration device.

The magnetic liquid, abrasive liquid, and protrusion-forming agent liquid, as well as other components in the form of a lubricant and curing agent liquid, were charged to a dissolver-stirrer and stirred for 30 minutes at a peripheral speed of 10 m/s. The mixture was subjected to three passes of processing in a flow-type ultrasonic disperser at a flow of 7.5 kg/min, and filtered with a filter having a pore diameter of 1 μm to prepare a magnetic layer-forming composition.

(Preparation of Nonmagnetic Layer-Forming Composition)

A nonmagnetic layer-forming composition was prepared by the following method.

The above components, excluding the lubricants (stearic acid, amide stearate, and butyl stearate) were kneaded and dilution processed in an open kneader and then dispersion processed in a bead mill disperser. Subsequently, the lubricants (stearic acid, amide stearate, and butyl stearate) were added and the mixture was stirred and mixed in a dissolver-stirrer to prepare a nonmagnetic layer-forming composition.

(Preparation of Backcoat Layer-Forming Composition)

A backcoat layer-forming composition was prepared by the following method.

The above components, excluding the polyisocyanate and lubricants (stearic acid, amide stearate, and butyl stearate), were charged to a dissolver-stirrer, stirred for 30 minutes at a peripheral speed of 10 m/s, and then dispersion processed in a horizontal bead mill disperser. Subsequently, the polyisocyanate and lubricants (stearic acid, amide stearate, and butyl stearate) were added and the mixture was stirred and mixed in a dissolver-stirrer to prepare a backcoat layer-forming composition.

(Fabrication of Magnetic Tape)

The nonmagnetic layer-forming composition was coated and dried to a dry thickness of 0.10 μm on one surface of a nonmagnetic support (polyamide support) 4.00 μm in thickness. Subsequently, the backcoat layer-forming composition was coated and dried to a dry thickness of 0.50 μm on the surface on the opposite side of the nonmagnetic support. The nonmagnetic support was wound up on a wind-up roll and heat treated for 36 hours in an environment with an atmospheric temperature of 70° C.

The magnetic layer-forming composition was coated and dried to a dry thickness of 70 nm over the nonmagnetic layer following the heat treatment.

The thickness of each of the various layers given above is the design thickness calculated from the manufacturing conditions.

Subsequently, a surface-smoothing treatment (calendering treatment) was conducted at a calender roll surface temperature of 100° C., a linear pressure of 300 kg/cm (294 kN/m), and a speed of 100 m/min using a calender comprised solely of metal rolls. The more intense the calender treatment conditions (for example, the higher the surface temperature of the calender rolls), the lower magnetic layer surface Ra tended to become.

Subsequently, a heat treatment was conducted for 36 hours in an environment with an atmospheric temperature of 70° C. Following the heat treatment, the product was slit to ½ inch (0.0127 meter) width.

Next, a surface treatment using the diamond wheel described in Japanese Unexamined Patent Publication (KOKAI) Heisei No. 5-62174 (the embodiment shown in FIGS. 1 to 3 of this publication) was conducted. The magnetic tape obtained was wound up into a roll on a reel, after which the properties thereof were evaluated by the following evaluation methods.

(Formation of Timing Based Servo Pattern)

With the magnetic layer of the magnetic tape that had been fabricated in a demagnetized state, a servo write head mounted on a servo writer was used to form a servo pattern of layout and shape that were in accordance with the LTO Ultrium format on the magnetic layer Thus, a magnetic tape was obtained that had data bands, servo bands, and guide bands in a layout in conformity with the LTO Ultrium format on the magnetic layer, and had a servo pattern of a layout and shape in accordance with the LTO Ultrium format on the servo bands.

Examples 2 to 6, Comparative Examples 1 to 5

With the exceptions that the formula of the magnetic layer-forming composition shown in Table 1 and/or the manufacturing conditions were changed, magnetic tapes were fabricated by the same methods as in Example 1.

The formula ratio of the ferromagnetic hexagonal barium ferrite powder given in Table 1 refers to the content by weight of the various ferromagnetic hexagonal barium ferrite powders relative to 100.0 weight parts of the total quantity of ferromagnetic powder. The average particle size of the ferromagnetic hexagonal barium ferrite powder given in Table 1 is a value obtained by collecting a necessary quantity from a powder lot used to fabricate magnetic tape and measuring the average particle size by the method described above. Following measurement, the ferromagnetic hexagonal barium ferrite powder was used to prepare the magnetic liquid for fabricating magnetic tape.

[Evaluation Methods]

(1) Magnetic Layer Surface Ra

An atomic force microscope (AFM, Nanoscope 4 made by Veeco) was employed to measure a 40 μm×40 μm measurement area, and the centerline average surface roughness Ra was obtained on the surface of the magnetic layer of the tape. The scan rate (probe displacement speed) was 40 μm/s, and the resolution was 512 pixels×512 pixels.

(2) Base Portion Friction

Scribe marks were made in advance with a laser marker on the measurement surface and an atomic force microscope (AFM) image was measured in a portion at a certain distance (about 100 μm) from them. This was done at a viewing area 7 μm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 6, in the component map by SEM, alumina and colloidal silica were not confirmed on the base portion. Component analysis was performed there by SEM. However, component analysis is not limited to SEM, and can be conducted by known methods such as energy dispersive X-ray spectrometry (EDS), auger electron spectroscopy (AES), or the like.

(3) PES Measurement

The servo pattern on the magnetic tape on which the above timing based servo pattern had been formed was read with a verify head on a servo writer which was employed for forming the servo pattern. The verify head was a reading-use magnetic head for verifying the quality of servo patterns formed on magnetic tapes. In the same manner as a magnetic head on a known magnetic tape device (drive), elements were disposed on it to read positions corresponding to servo pattern positions (positions in the direction of width of the magnetic tape).

A known PES calculation circuit that calculated the head positioning precision in a servo system as a PES from the electrical signal obtained by reading the servo pattern with the verify head was connected to the verify head. The PES calculation circuit calculated as needed the displacement in the direction of width of the magnetic tape from an electrical signal (pulse signal) that was inputted, and calculated the PES as the value obtained by applying a high-pass filter (cutoff: 500 cycles/m) to tie time change information (signal) of this displacement.

(4) Evaluation of Electromagnetic Characteristics (Signal-to-Noise Ratio (SNR))

As set forth above, a signal was recorded at a linear recording density of 325 kfci on the magnetic tapes fabricated as set forth above in an environment with an atmospheric temperature of 23° C.±1° C. and 50% relative humidity with a loop tester on which had been mounted a metal-in-gap (MIG) recording head (gap length 0.15 μm, 1.8 T) and a reproduction-use giant magnetoresistive (GMR) head (reproduction track width: 1 μm). Subsequently, the reproduction output was measured and the SNR was calculated as the ratio of the reproduction output to the noise. When the SNR of Comparative Example 1 was adopted as 0 dB, an SNR of greater than or equal to 2.0 dB was evaluated as affording performance that would be capable of responding to the stringent future needs of higher density recording.

The results of the above are given in Table 1.

TABLE 1

| | | | Unit | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 | Ex. 5 | Ex. 6 |
|---|---|---|---|---|---|---|---|---|---|---|---|---|---|---|
| Magnetic layer | Ferromagnetc hexagonal ferrite barium powder (1) | Average particle size | nm | 25 | 25 | 25 | 25 | 25 | 25 | 25 | 25 | 25 | 25 | 25 |
| | | Formula ratio | % | 100.0 | 100.0 | 100.0 | 100.0 | 100.0 | 99.0 | 95.0 | 99.0 | 95.0 | 95.0 | 99.2 |
| | Ferromagnetic hexagonal ferrite barium powder (1) | Average particle size | nm | — | — | — | — | — | 55 | 55 | 55 | 55 | 55 | 55 |
| | | Formula ratio | % | — | — | — | — | — | 1.0 | 5.0 | 1.0 | 5.0 | 5.0 | 0.8 |
| Manufacturing condition | Calendar roll surface temperature | | ° C. | 80 | 90 | 95 | 100 | 110 | 100 | 100 | 105 | 105 | 110 | 100 |
| Surface properties magnetic layer | Centerline average surface roughness Ra (magnetic layer surface Ra) | | nm | 2.5 | 2.2 | 2.0 | 1.8 | 1.5 | 1.8 | 1.8 | 1.6 | 1.6 | 1.5 | 1.8 |
| | Base portion friction | | — | 0.45 | 0.45 | 0.45 | 0.45 | 0.45 | 0.28 | 0.20 | 0.28 | 0.20 | 0.20 | 0.35 |
| Performance | PES | | nm | 8.6 | 8.7 | 8.9 | 19.6 | Measurement was impossible | 8.2 | 7.9 | 8.5 | 7.8 | 7.8 | 8.8 |
| | SNR | | dB | 0 | 0.7 | 1.5 | 2.2 | 2.5 | 2.0 | 2.2 | 2.4 | 2.5 | 2.5 | 2.2 |

PES as calculated by the method set forth above of less than or equal to 9.0 nm indicates that the recording head can be highly precisely positioned by head tracking in a timing based servo system.

Based on a comparison of Comparative Examples 1 to 3 and Comparative Example 4, magnetic tapes with a magnetic layer surface Ra of less than or equal to 1.8 nm were found to exhibit a phenomenon (drop in head positioning precision) where the PES greatly exceeded 9.0 nm.

PES evaluation of the magnetic tape of Comparative Example 5 was precluded by an extremely low sliding property of the servo head, making it impossible to run the servo head. Since the magnetic layer surface Ra is 1.5 nm and thus the smoothness of the magnetic layer surface is high, the reason is thought to be the high base portion friction of 0.45 despite the high probability of contact between the servo head and the base portion.

By contrast, although the magnetic tapes of Examples 1 to 6 had a magnetic layer surface Ra of less than or equal to 1.8 nm, the PES was less than or equal to 9.0 nm, that is, it was possible to improve head positioning precision in a timing based servo system.

The facts that the magnetic layer surface Ra was less than or equal to 1.8 nm and thus the surface smoothness of the magnetic layer was high are thought to contribute to the magnetic tapes of Examples 1 to 6 exhibiting SNRs of greater than or equal to 2.0 nm.

An aspect of the present invention is useful in the technical field of magnetic tapes for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on a nonmagnetic support, wherein
a timing based servo pattern is present on the magnetic layer;
a centerline average surface roughness Ra that is measured on a surface of the magnetic layer is less than or equal to 1.8 nm; and
a coefficient of friction that is measured on a base portion of the surface of the magnetic layer is less than or equal to 0.35.

2. The magnetic tape according to claim 1,
wherein the coefficient of friction that is measured on the base portion falls within a range of 0.15 to 0.35.

3. The magnetic tape according to claim 1,
wherein the coefficient of friction that is measured on the base portion falls within a range of 0.15 to 0.30.

4. The magnetic tape according to claim 1,
wherein the centerline average surface roughness Ra falls within a range of 1.2 nm to 1.8 nm.

5. The magnetic tape according to claim 1,
wherein the centerline average surface roughness Ra falls within a range of 1.2 nm to 1.6 nm.

6. The magnetic tape according to claim 1,
which comprises a nonmagnetic layer comprising nonmagnetic powder and binder between the nonmagnetic support and the magnetic layer.

7. The magnetic tape according to claim 1,
wherein the coefficient of friction that is measured on the base portion falls within a range of 0.20 to 0.35; and
the centerline average surface roughness Ra falls within a range of 1.5 nm to 1.8 nm.

8. A magnetic tape device,
which comprises a magnetic tape, a magnetic head and a servo head, wherein
the magnetic tape is a magnetic tape which comprises a magnetic layer comprising ferromagnetic powder and binder on a nonmagnetic support, wherein
a timing based servo pattern is present on the magnetic layer;
a centerline average surface roughness Ra that is measured on a surface of the magnetic layer is less than or equal to 1.8 nm; and
a coefficient of friction that is measured on a base portion of the surface of the magnetic layer is less than or equal to 0.35.

9. The magnetic tape device according to claim 8,
wherein the coefficient of friction that is measured on the base portion falls within a range of 0.15 to 0.35.

10. The magnetic tape device according to claim 8,
wherein the coefficient of friction that is measured on the base portion falls within a range of 0.15 to 0.30.

11. The magnetic tape device according to claim 8,
wherein the centerline average surface roughness Ra falls within a range of 1.2 nm to 1.8 nm.

12. The magnetic tape device according to claim 8,
wherein the centerline average surface roughness Ra falls within a range of 1.2 nm to 1.6 nm.

13. The magnetic tape device according to claim 8,
wherein the magnetic tape comprises a nonmagnetic layer comprising nonmagnetic powder and binder between the nonmagnetic support and the magnetic layer.

14. The magnetic tape device according to claim 8,
wherein the coefficient of friction that is measured on the base portion falls within a range of 0.20 to 0.35; and
the centerline average surface roughness Ra falls within a range of 1.5 nm to 1.8 nm.

* * * * *